United States Patent [19]
Winkelmann et al.

[11] Patent Number: 5,105,793
[45] Date of Patent: Apr. 21, 1992

[54] MECHANICAL DRIVING MECHANISM OF A SUPERCHARGER FOR AN INTERNAL COMBUSTION ENGINE

[75] Inventors: Siegfried Winkelmann, Tettnang; Karl Schlichtig, Friedrichshafen; Harald Breisch, Kressbronn, all of Fed. Rep. of Germany

[73] Assignee: Zahnradfabrik Friedrichshafen, AG., Friedrichshafen, Fed. Rep. of Germany

[21] Appl. No.: 460,920

[22] Filed: Aug. 31, 1988

[86] PCT. No.: PCT/EP88/00780
§ 371 Date: Feb. 20, 1990
§ 102(e) Date: Feb. 20, 1990

[87] PCT Pub. No.: WO89/02535
PCT Pub. Date: Mar. 23, 1989

[30] Foreign Application Priority Data
Sep. 5, 1987 [DE] Fed. Rep. of Germany ....... 3729889

[51] Int. Cl.⁵ .......................... F03B 3/16; F02B 33/00
[52] U.S. Cl. ................................ 123/559.1; 123/561; 415/203
[58] Field of Search ............................ 123/559.1, 561; 415/124.1, 214.1, 203, 204, 205, 122.1, 182.1

[56] References Cited
U.S. PATENT DOCUMENTS
4,802,820 2/1989 Komatsu ............................ 415/203

FOREIGN PATENT DOCUMENTS
2580723 10/1986 France .
0413986 5/1966 Switzerland .

Primary Examiner—Richard A. Bertsch
Assistant Examiner—Alfred Basichas
Attorney, Agent, or Firm—Albert M. Zalkind

[57] ABSTRACT

In a mechanical driving mechanism of a supercharger (1) for an internal combustion engine, which, starting from the internal combustion engine, acts on a rotor shaft (12) of a rotor (14) located on a supercharger housing through a planetary gear assembly (3) that is geared up, a compact construction of the driving mechanism and a balancing out of vibration between a primary shaft (2) and the rotor shaft (12) can be achieved. For that purpose, a ring gear (6) is propelled by the primary shaft (2), while the rotor shaft (12) that receives a sun wheel (8) is accommodated in a hub part (15) of a pinion cage (16) of the planetary gear assembly (3).

11 Claims, 2 Drawing Sheets

MECHANICAL DRIVING MECHANISM OF A SUPERCHARGER FOR AN INTERNAL COMBUSTION ENGINE

BACKGROUND OF THE INVENTION

The invention relates to a mechanical driving mechanism of a supercharger for an internal combustion engine in which a rotor located in a supercharger housing is capable of being propelled by the internal combustion engine through a step-up gear that is a planetary gear, and by a rotor shaft.

BRIEF DESCRIPTION OF THE PRIOR ART

In a driving mechanism of a supercharger of this type (DE-PS 582 797), a clutch connected with the internal combustion engine's crankshaft and having a step-up gear in the form of a planetary gear and a supercharger are provided as separate structural units. By means of the clutch and a pawl free-wheeling mechanism, the supercharger can be shifted into two different revolutions-per-minute-stages—that is, a direct drive through the pawl free-wheeling mechanism and a geared stage with propulsion of the pinion cage with a stationary ring gear and secondary drive through a sun wheel fixed with the rotor shaft.

The known mechanical driving mechanism of a supercharger is not suitable for use on an internal combustion engine that is installed in a motor vehicle because of its large axial overall length. Since the pinion cage serves simultaneously as a coupling element for the friction coupling that is encumbered axially—because of a coupling operation—by way of a pressure plate and friction disks, pressure that has a negative influence on the noise and the working life of the planetary gear develops in the seating of the planetary wheels and also in the gear-tooth system of the planetary gear. Furthermore, imbalance at the rotating pinion cages with planetary wheels resting on them cannot be avoided, and when that is the case these balance deficiencies trigger vibrations in the rotor shaft that is meshed with the planetary wheels through a sun wheel, and those vibrations result in the destruction of the sealing of the rotor-shaft. Another problem results from the fact that, when the pinion cage is rotating, a greater expenditure is necessary to deliver lubricating oil to the seating of the planetary wheels in sufficient quantities resulting in lubricating oil being thrown off in an undesired manner by the centrifugal force appearing in the seating. Finally, in addition to the rotating secondary carrier, a separate supporting wall is necessary to receive the rotor shaft's seating, and as a result the cost for construction and the dimensions of the driving device are increased considerably.

The object of the present invention is to avoid the above-mentioned disadvantages and to create a mechanical driving mechanism of a supercharger in which the dimensions and the costs for construction are reduced while overloading of structural parts in the planetary gear are avoided.

SUMMARY OF THE INVENTION

This object is achieved in a mechanical driving mechanism of a supercharger of the above-mentioned type by having the supercharger and the planetary gear assembly form one structural unit, with a ring gear of the planetary gear assembly being fixed with a primary shaft and the rotor shaft receiving a sun wheel accommodated in a hub part of a pinion cage of the planetary gear assembly. By this construction, the planetary wheels act as buffers between the ring gear that is fastened to the primary shaft and the sun wheel of the driven rotor shaft strongly geared to revolutions per minute, so that a stimulation of the rotor shaft by the primary shaft or the planetary gear to cause vibration is avoided. Furthermore, rotation deficiencies in the gear-tooth system in the planetary gear assembly are kept low because of the propulsion through the ring gear. The pinion cage, in addition to supporting the planetary wheels, simultaneously takes over the function of supporting the rotor shaft as a compact structural unit in an advantageous manner.

The planetary wheels can perform their function as vibration-damping members between the primary shaft and the rotor shaft by providing a floating support to their trunnions that are secured in the pinion cage, and when that is the case the rotor shaft is only guided in the pinion cage by two angular ball bearings. The weight of the supercharger driving mechanism can be reduced in an advantageous manner by making the pinion cage an aluminum part. Because of the different thermal expansion of the pinion cage that is made of aluminum and the guide bolt that is made of steel, provision is made for expanding the end of the guide bolt that is inserted in the pinion cage. It is possible to give one side of the guide bolt a cut with a saw in the appropriate area and to tip down the part that has been cut by means of a bolt inserted axially in the guide bolt. Wedge-shaped elements can also be provided at the end of the guide bolt that spread the end under tensile stress applied by a stretching device.

In another embodiment of the invention, the pinion cage can form a side of the supercharger simultaneously since a wall extends radially outwardly from the hub part. The step-down gear is then on one side of the wall and the interior of the supercharger housing, which is under manifold pressure, is on the other side. In this embodiment, the pinion cage can be connected with a transmission case of the step-up gear and a radial part of the circumference of the supercharger housing by a fixed link projecting radially. In this way, the pinion cage, with the rotor shaft accommodated in it and the rotor, as well as the parts of the planet gear, sun wheel and planetary wheels, can be preassembled as a structural unit that is then introduced into the inside of the transmission case and is then connected with the transmission case and the compressor housing.

When assembling the structural elements fastened to the pinion cage in the transmission case, special guidance of the pinion cage with respect to the transmission case that makes precise insertion of the planetary wheel in the ring gear possible is very advantageous. For that purpose, there is provided, at the side of the pinion cage, a wall section that is essentially at right angles to it and that is guided by the inner surface of the transmission case during the insertion process. Uniform lubrication and dissipation of the heat from the planetary gear assembly can be achieved by special drain openings or bores that are located radially on the ring gear. On the basis of centrically-symmetric centering of the supercharger housing on the pinion cage, the supercharger housing can be moved into certain positions around its axis of rotation. It is especially advantageous in this regard if, at special fixed tension links of the transmission box, the fixed links of the pinion cage and a flange like section of the supercharger housing are fastened with tension claws. In that case, the tangential short manifold pressure feed pipes of the supercharger housing are put at any setting at all, so that an appropriate connecting hose to the internal combustion engine's manifold pressure conduit can be favorably located.

Furthermore, the wall of the pinion cage can be a manifold pressure heat exchanger. When that is the case, it is possible to heat or cool the manifold pressure striking the wall on the inside of the supercharger housing. Lubricating oil or the internal combustion engine's coolant can serve as the heat exchanging medium, with separate bores being provided in the wall to conduct the liquid heat transfer medium in appropriate instances. Furthermore, the heat transfer from the manifold pressure to the liquid heat transfer medium can be improved by using special ribs or by installing heat pipes.

BRIEF DESCRIPTION OF THE FIGURES

For further explanation of the invention, reference is made to the drawings, in which.

DETAILED DESCRIPTION

Figure 1:
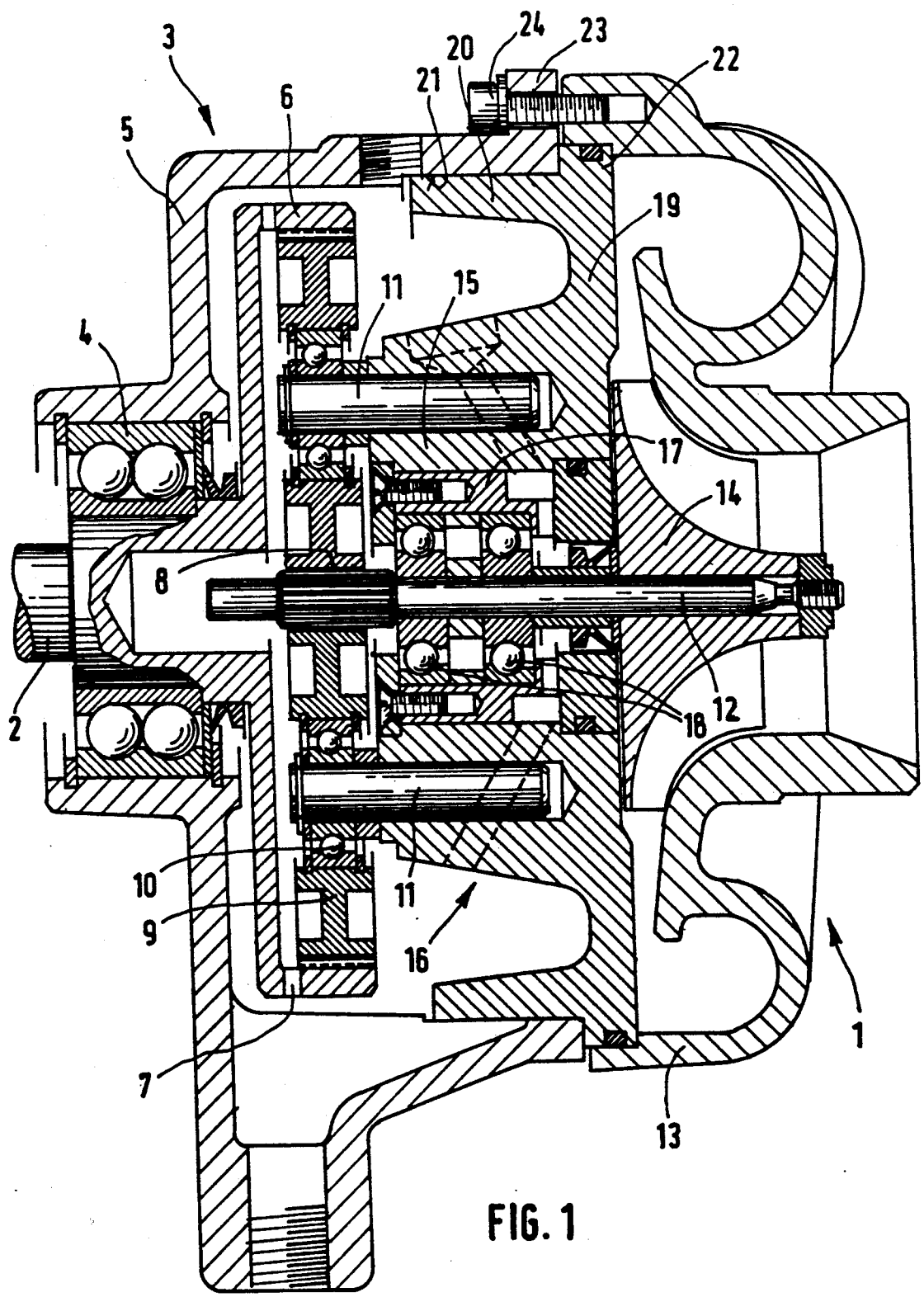
FIG. 1 shows a longitudinal section through a preferred embodiment of a mechanical driving mechanism of a supercharger according to the invention.
Figure 2:
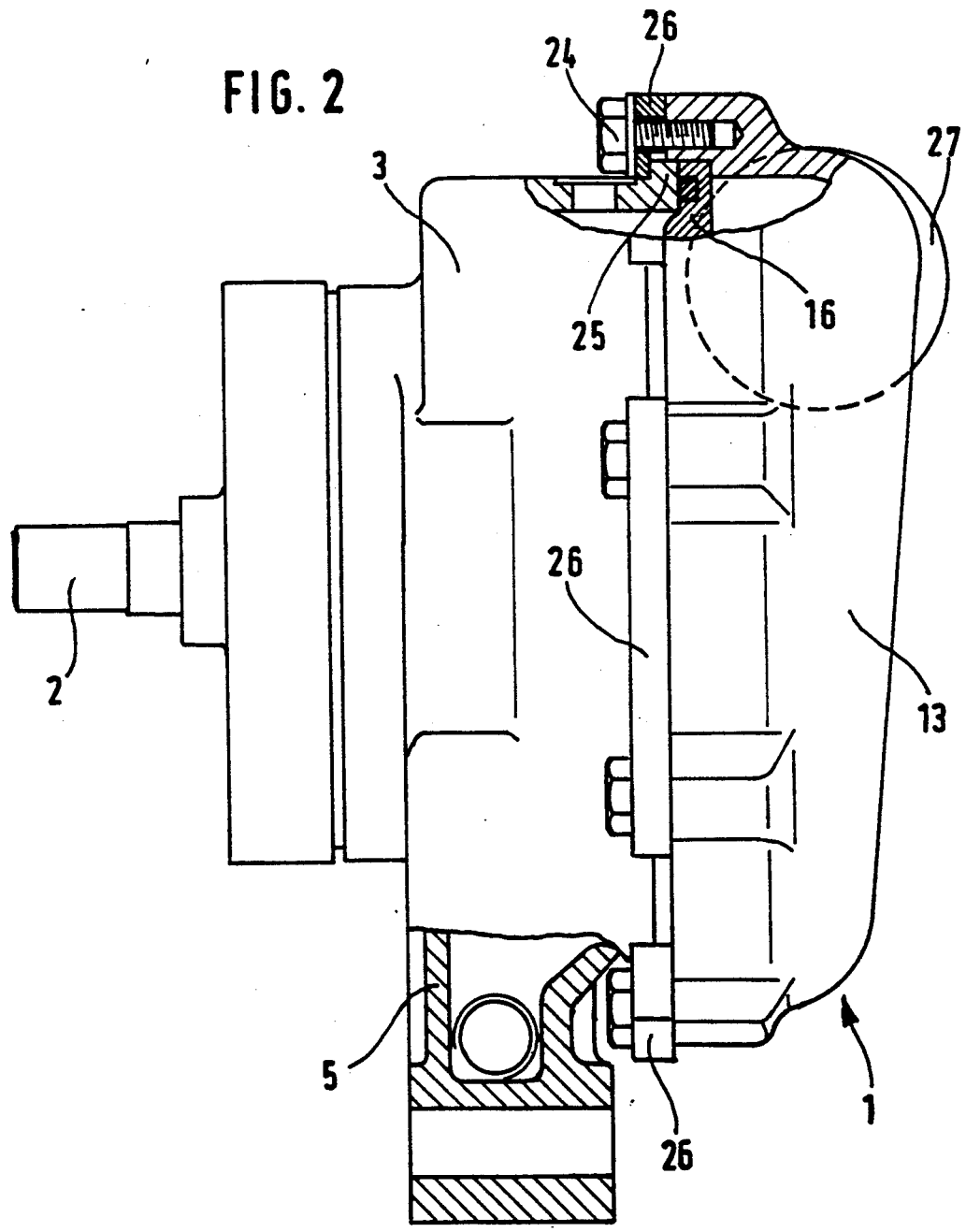
FIG. 2 shows a side view of an alternate embodiment including a supercharger and a mechanical driving mechanism, with partial sections in the area where a supercharger housing and a pinion cage are fastened to a transmission case.

In FIGS. 1 and 2, to the extent they are shown, a supercharger for an internal combustion engine is designated 1 that is capable of being propelled by the internal combustion engine by propulsion elements (not shown) such as a looping, gear wheel or hydrostatic gears, for example, by means of a primary shaft 2 and a planetary gear assembly 3 serving as a step-up gear.

According to FIG. 1, the primary shaft 2 is accommodated above a double-line ball bearing 4 in a transmission case 5 of the planetary gear assembly and fixed with a ring gear 6 of the planetary gear assembly 3. The ring gear 6 has radial drain openings or bores 7 that are distributed uniformly along the circumference of the ring gear 6 and are intended to ensure a uniform flow of lubrication oil through the ring gear 6. Meshed with the ring gear 6 and a sun wheel 8 are planetary wheels 9 that are supported by ball bearings 10 on guide bolts 11. The sun wheel 8 is fixed with a rotor shaft 12 that ends, on the other side, in the inside of a supercharger housing 13 and bears a rotor 14 serving the purpose of sealing off air that is drawn in. The guide bolts 11 are fastened in a hub portion 15 of a pinion cage 16. By means of a bushing 17, the pinion cage 16 picks up two angular ball bearings 18 in which the rotor shaft 12 is accommodated.

Furthermore, the pinion cage has a wall 19 extending radially that serves as a partition between the inside of the transmission case 5 and the inside of the supercharger housing 13. At the end of the wall 19, a section 20 of a partition extending at a right angle to it is provided that is run to an inner surface 21 of the transmission case. A fixed link 22 projects above this section 20 of a partition that is stretched between a flange 23 of the transmission case 5 and the supercharger housing 13 by bolts 24.

According to the alternate embodiment of the invention shown in FIG. 2, the transmission case 5 has an extended fixed link 25 instead of a flange for extending the supercharger housing 13 and the pinion cage 16, with which stretching fixed link 25 tension clasps 26 are connected with the supercharger housing 13 by bolts 24 engage the link so that there is a clamped joint between the transmission case 5, the pinion cage 16 and the supercharger housing 13. After the bolts 24 are disengaged, the supercharger housing 13 can be moved to the transmission case 5 and the pinion cage by rotating around the axis of rotation, so that a tangential short manifold pressure feed pipe 27 can be brought into a position suitable for connection with an internal combustion engine.

We claim:

1. In a mechanical driving mechanism of a supercharger having a housing (13) containing a rotor (14) connected with a rotor shaft (12) and driven off an internal combustion engine via a planetary gear assembly (3) which operates as a step-up gear, the improvement wherein the planetary gear assembly and the supercharger are formed as a unitary structure, the planetary gear assembly including
   (a) a primary shaft (2) coaxial with the rotor shaft;
   (b) a ring gear (6) fixed with one end of the primary shaft for rotation therewith;
   (c) a pinion cage (16) including a hub portion (15) containing an axial opening for supporting the rotor shaft and a plurality of recesses extending parallel to and arranged radially relative to said axial opening;
   (d) a sun wheel (8) mounted on the rotor shaft within said hub portion; and
   (e) a planetary wheel (9) concentrically arranged between said ring gear and said sun wheel, said planetary wheel being supported in a floating manner on said pinion cage by guide bolts (11) having ends inserted into said hub portion recesses, said guide bolt ends having a length less than the depth of said recesses to afford limited axial play of said cage with respect to said planetary wheel, whereby said planetary wheel operates as a buffer between said ring gear and said sun gear to prevent vibration of the rotor shaft with respect to the primary shaft.

2. A mechanical drive mechanism as defined in claim 1, wherein said pinion cage is made from aluminum and said guide bolts are made from steel, the ends of said guide bolts arranged in said pinion cage being mechanically expansible.

3. A mechanical drive mechanism as defined in claim 1, and further comprising a pair of angular ball bearings (18) for supporting the rotor shaft in said pinion cage hub.

4. A mechanical drive mechanism as defined in claim 1, wherein said pinion cage includes a radial wall (19) extending from said hub to define a partition of the supercharger housing.

5. A mechanical drive mechanism as defined in claim 1, wherein said planetary gear assembly includes a transmission case (5) and said pinion cage includes a radial link (22) for connection with said case and with the supercharger housing.

6. A mechanical drive mechanism as defined in claim 5, wherein said pinion cage includes a radial wall (19) extending from said hub, said wall including projection sections (20) at right angles to said wall which extend adjacent an inner surface of said transmission case.

7. A mechanical drive mechanism as defined in claim 1, wherein said ring gear includes a plurality of radial bores (7) for dispensing lubricating oil from said planetary gear assembly.

8. A mechanical drive mechanism as defined in claim 1, wherein the supercharger housing is symmetrically and centrally arranged relative to an axis of rotation of the rotor.

9. A mechanical drive mechanism as defined in claim 5, wherein the supercharger housing includes a tangential manifold pressure feed pipe (27) connected with fixed stretching links (28) of said transmission case and with said pinion cage via segmented tension clasps (26).

10. A mechanical drive mechanism as defined in claim 4, wherein said pinion cage radial wall comprises a manifold pressure heat exchanger.

11. A mechanical drive mechanism as defined in claim 10, wherein said radial wall contains a plurality of bores for the flow of a liquid heat transfer medium.

* * * * *